(12) United States Patent
Yao et al.

(10) Patent No.: US 8,315,518 B1
(45) Date of Patent: Nov. 20, 2012

(54) TECHNIQUE FOR TRANSMITTING AN OPTICAL SIGNAL THROUGH AN OPTICAL NETWORK

(75) Inventors: Zhonghui Yao, Kanata (CA); Jeffrey Fitchett, Kanata (CA); Kent Felske, Kanata (CA)

(73) Assignee: Ciena Corporation, Hanover, MD (US)

( * ) Notice: Subject to any disclaimer, the term of this patent is extended or adjusted under 35 U.S.C. 154(b) by 2957 days.

(21) Appl. No.: 10/441,025

(22) Filed: May 20, 2003

Related U.S. Application Data

(60) Provisional application No. 60/411,618, filed on Sep. 18, 2002.

(51) Int. Cl.
  *H04B 10/00* (2006.01)
(52) U.S. Cl. .................. 398/45; 398/48; 398/50
(58) Field of Classification Search .................. 398/162, 398/45–57
  See application file for complete search history.

(56) References Cited

U.S. PATENT DOCUMENTS

| | | | |
|---|---|---|---|
| 5,781,537 A * | 7/1998 | Ramaswami et al. | ........ 370/254 |
| 5,848,055 A | 12/1998 | Fedyk et al. | |
| 6,038,230 A | 3/2000 | Ofek | |
| 6,195,354 B1 | 2/2001 | Skalecki et al. | |
| 6,259,695 B1 | 7/2001 | Ofek | |
| 6,272,131 B1 | 8/2001 | Ofek | |
| 6,272,132 B1 | 8/2001 | Ofek et al. | |
| 6,288,811 B1 | 9/2001 | Jiang et al. | |
| 6,307,986 B1 | 10/2001 | Duerksen et al. | |
| 6,314,095 B1 | 11/2001 | Loa | |
| 6,321,004 B1 | 11/2001 | Duerksen et al. | |
| 6,330,236 B1 | 12/2001 | Ofek et al. | |
| 6,331,978 B1 | 12/2001 | Ravikanth et al. | |
| 6,332,198 B1 | 12/2001 | Simons et al. | |
| 6,336,129 B1 | 1/2002 | Ise et al. | |
| 6,348,985 B1 | 2/2002 | Jiang et al. | |
| 6,356,544 B1 | 3/2002 | O'Connor | |
| 6,363,053 B1 | 3/2002 | Schuster et al. | |
| 6,363,319 B1 | 3/2002 | Hsu | |
| 6,377,579 B1 | 4/2002 | Ofek | |
| 6,385,198 B1 | 5/2002 | Ofek et al. | |
| 6,728,484 B1 * | 4/2004 | Ghani | ............................. 398/42 |
| 6,879,783 B1 * | 4/2005 | Nakahira | ........................ 398/51 |

(Continued)

FOREIGN PATENT DOCUMENTS

CA  2243034  1/1999

(Continued)

OTHER PUBLICATIONS

John Y. Wei, IEEE Member, and Ray I. McFarland, Jr., IEEE Member, "Just-In-Time signaling for WDM optical burst switching networks," J. Lightwave Technol., vol. 18, No. 12, Dec. 2000.*

*Primary Examiner* — Agustin Bello
(74) *Attorney, Agent, or Firm* — Tyler S. Brown

(57) ABSTRACT

A technique for transmitting an optical signal along an optical wavelength path through an optical network having a plurality of network nodes is disclosed. In one particular exemplary embodiment, the technique may be realized as a method for transmitting an optical signal along an optical wavelength path through an optical network having a plurality of network nodes. Such a method may comprise transmitting a first message from a first node to a second node requesting an optical wavelength path from the first node to at least the second node, and simultaneously configuring the first node for transmitting an optical signal along the optical wavelength path from the first node to the second node.

19 Claims, 11 Drawing Sheets

U.S. PATENT DOCUMENTS

| | | | |
|---|---|---|---|
| 7,130,264 B2 * | 10/2006 | Wiebe et al. | 370/225 |
| 2001/0033570 A1 | 10/2001 | Makam et al. | |
| 2001/0036191 A1 | 11/2001 | Borchering | |
| 2001/0046208 A1 | 11/2001 | Eng et al. | |
| 2002/0004843 A1 | 1/2002 | Andersson et al. | |
| 2002/0018264 A1 | 2/2002 | Kodialam et al. | |
| 2002/0018269 A1 | 2/2002 | Chaudhuri et al. | |
| 2002/0018468 A1 | 2/2002 | Nishihara | |
| 2002/0018475 A1 | 2/2002 | Ofek et al. | |
| 2002/0030864 A1 | 3/2002 | Chaudhuri et al. | |
| 2002/0049856 A1 | 4/2002 | Hujber | |
| 2002/0055999 A1 | 5/2002 | Takeda | |
| 2004/0208556 A1 * | 10/2004 | Joly et al. | 398/57 |

FOREIGN PATENT DOCUMENTS

| | | |
|---|---|---|
| CA | 2191057 | 12/2002 |
| EP | 1093262 | 4/2001 |
| EP | 1126740 | 8/2001 |
| EP | 1173039 | 1/2002 |

* cited by examiner

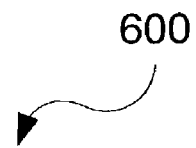

600

| |
|---|
| Phase 1 and Phase 2 are the same as in Figure 4. |
| Phase 3: Failure restoration<br>• Re-dial starts<br>• In the forward direction, from source to destination node,<br>    ▪ Each node sends a control message to request resources hop by hop toward the destination node with the suggested wavelength<br>    ▪ At the same time, invokes an OXC switching event for wavelength assignment with the suggested wavelength<br>• In the backward direction, from destination to source node,<br>    ▪ Each node waits for wavelength assignment to be completed, if required<br>    ▪ Sends a control message to the next hop<br>• Data is switched to the newly established path for failure restoration after it is established |

Figure 6

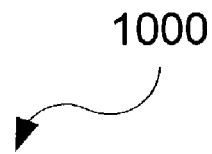

Phase 1 and Phase 2 are the same as in Figure 4.

Phase 3: Failure restoration
- Re-dial starts
- In the forward direction, from source to destination node,
  - Each node sends a control message to request resources hop by hop toward the destination node with the suggested wavelength
  - Schedules an OXC switching event for wavelength assignment at $t_{TH}$ with the suggested wavelength
- In the backward direction, from destination to source node,
  - Each node checks if the OXC switching event scheduled at $t_{TH}$ in the forward direction is in progress
    - If not, cancels the OXC switching event scheduled at $t_{TH}$ in the forward direction and invokes another OXC switching event at the present time and waits for the required OXC switching time
    - Otherwise, waits for wavelength assignment to be completed, if required
  - Sends a control message to the next hop
- Data is switched to the newly established path for failure restoration after it is established

Figure 10

TECHNIQUE FOR TRANSMITTING AN OPTICAL SIGNAL THROUGH AN OPTICAL NETWORK

CROSS-REFERENCE TO RELATED APPLICATIONS

This patent application claims priority to U.S. Provisional Patent Application No. 60/411,618, filed Sep. 18, 2002, which is hereby incorporated by reference herein in its entirety.

FIELD OF THE INVENTION

The present invention relates generally to optical networks and, more particularly, to a technique for transmitting an optical signal along an optical wavelength path through an optical network having a plurality of network nodes.

BACKGROUND OF THE INVENTION

An intelligent photonic network (IPN) is considered to be a next generation network because of its capability to support potential unlimited bandwidth and its flexibility for dynamic network connectivity. Referring to FIG. 1, there is shown an example of an IPN network 100 in a meshed topology. As shown in FIG. 1, the network 100 comprises a plurality of access nodes 102, a plurality of edge nodes 104, and a plurality of core nodes 106. Each of the plurality of edge nodes 104 and each of the plurality of core nodes 106 comprises a router 108 and an optical cross-connect (OXC) 110. Each of the plurality of access nodes 102 is connected to a respective one of the plurality of edge nodes 104 by an optical fiber 112. Similarly, each of the plurality of edge nodes 104 is connected to at least one respective core node 106 by an optical fiber 112. Also, the core nodes 106 are connected by an optical fiber 112.

The network 100 may also be viewed logically having two planes. That is, as shown in FIG. 2, the network 100 may be viewed as having a data plane 202 and a control plane 204. The data plane 202, which comprises optical cross-connects (OXC) 110, performs data forwarding. The control plane 204, which comprises routers 108, is implemented with a set of intelligent protocols and handles all control messages.

With implemented intelligent protocols, the IPN network 100 is able to act like a circuit-switched network that is capable of handling network topology discovery, signal routing, wavelength path calculation and selection, wavelength path signaling and provisioning, failure detection and isolation, failure protection and restoration, network resource management, and so on, all dynamically. In this high-speed dynamic IPN network 100, failure protection and restoration under tight time constraints is a challenging problem. Failure restoration time is crucial to network performance in any protection and restoration scheme because long restoration time will cause data loss, which is not expected, especially in high-speed networks. On the one hand, a mechanism for failure protection and restoration is desirable because failures, such as fiber cuts or tragedy events, do occur in real networks. On the other hand, a protection and restoration mechanism should not become an obstacle for network capacity usage with full flexibility under normal conditions because the possibility of failure is very low in real networks. Consequently, two essential performance requirements for failure protection and restoration in photonic meshed networks become major challenges: 1) when a failure happens, the restoration time should be as short as possible; and 2) during normal network conditions, network capacity should be fully flexible for working path usage.

There are two common types of protection and restoration methods: reserved and unreserved, both having advantages and disadvantages. The key advantage of the reserved scheme is its speed because some alternative paths, called protection paths, are pre-calculated and allocated under normal network conditions to prevent failures that may happen sometime in future. This also brings a drawback of inefficient network capacity usage because there are always some capacities reserved ahead to prepare for possible future failures.

The unreserved scheme has an advantage of dynamically utilizing network capacity for working paths with full flexibility. In the unreserved scheme, spare capacity for failure restoration is also required, but it is not explicitly reserved in advance for any particular wavelength paths, though wavelength paths for restoration can be pre-calculated based on available capacity. A disadvantage of the unreserved scheme is its long restoration time because real-time signaling or re-dial is required in these schemes after failure detection and notification. Signaling should not be delayed by the switching speed of the data plane in a way that affects restoration time.

In view of the foregoing, it would be desirable to provide a technique for transmitting an optical signal through an optical network which overcomes the above-described inadequacies and shortcomings in an efficient and cost effective manner.

SUMMARY OF THE INVENTION

According to the present invention, a technique for transmitting an optical signal along an optical wavelength path through an optical network having a plurality of network nodes is provided. In one particular exemplary embodiment, the technique may be realized as a method for transmitting an optical signal along an optical wavelength path through an optical network having a plurality of network nodes. Such a method may comprise transmitting a first message from a first node to a second node requesting an optical wavelength path from the first node to at least the second node, and simultaneously configuring the first node for transmitting an optical signal along the optical wavelength path from the first node to the second node.

In accordance with other aspects of this particular exemplary embodiment of the present invention, simultaneously configuring the first node may beneficially comprise invoking an optical wavelength switching event concurrently with the transmitting of the first message. The method may then further beneficially comprise receiving a second message at the first node indicating that the previously invoked optical wavelength switching event is valid. The method may then further beneficially comprise determining if the previously invoked optical wavelength switching event is complete. The method may then further beneficially comprise transmitting a third message from the first node indicating that the previously invoked optical wavelength switching event is complete.

In accordance with further aspects of this particular exemplary embodiment of the present invention, simultaneously configuring the first node may beneficially comprise scheduling an optical wavelength switching event at a specific time. The method may then further beneficially comprise receiving a second message at the first node indicating that the previously scheduled optical wavelength switching event is valid. The method may then further beneficially comprise determining if the previously scheduled optical wavelength switching event is in progress. The method may then further beneficially comprise transmitting a third message from the first node indicating that the previously scheduled optical wavelength switching event is complete. Alternatively, the method may then further beneficially comprise canceling the previously scheduled optical wavelength switching event if not yet in progress, and invoking another optical wavelength switching event. The method may then further beneficially comprise transmitting a third message from the first node indicating that the invoked optical wavelength switching event is complete.

In another particular exemplary embodiment, the technique may be realized as at least one signal embodied in at least one carrier wave for transmitting a computer program of instructions configured to be readable by at least one processor for instructing the at least one processor to execute a computer process for performing the above-described method.

In still another particular exemplary embodiment, the technique may be realized as at least one processor readable carrier for storing a computer program of instructions configured to be readable by at least one processor for instructing the at least one processor to execute a computer process for performing the above-described method.

In yet another particular exemplary embodiment, the technique may be realized as an apparatus for transmitting an optical signal along an optical wavelength path through an optical network having a plurality of network nodes. Such an apparatus may comprise a router for transmitting a first message from a first node to a second node requesting an optical wavelength path from the first node to at least the second node, and an optical signal switching element that is simultaneously configured for transmitting an optical signal along the optical wavelength path from the first node to the second node.

In accordance with other aspects of this particular exemplary embodiment of the present invention, the optical signal switching element may beneficially be simultaneously configured by having an optical wavelength switching event invoked concurrently with the transmission of the first message. If such is the case, the router may beneficially transmit a second message from the first node indicating that the previously invoked optical wavelength switching event is complete.

In accordance with further aspects of this particular exemplary embodiment of the present invention, the optical signal switching element may beneficially be simultaneously configured by having an optical wavelength switching event scheduled at a specific time. If such is the case, the router may beneficially transmit a second message from the first node indicating that the previously scheduled optical wavelength switching event is complete. Alternatively, the router may beneficially cancel the previously scheduled optical wavelength switching event if not in progress at another specific time, and the optical signal switching element may then beneficially be alternatively configured by having another optical wavelength switching event invoked. The router may then beneficially transmit a second message from the first node indicating that the previously invoked optical wavelength switching event is complete.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 6 shows a table listing a series of events that occur at each switch node in a network in accordance with the present invention.

FIG. 10 shows a table listing a series of events that occur at each switch node in a network in accordance with an enhanced version of the present invention.

DETAILED DESCRIPTION OF EXEMPLARY EMBODIMENT(S)

Figure 1:
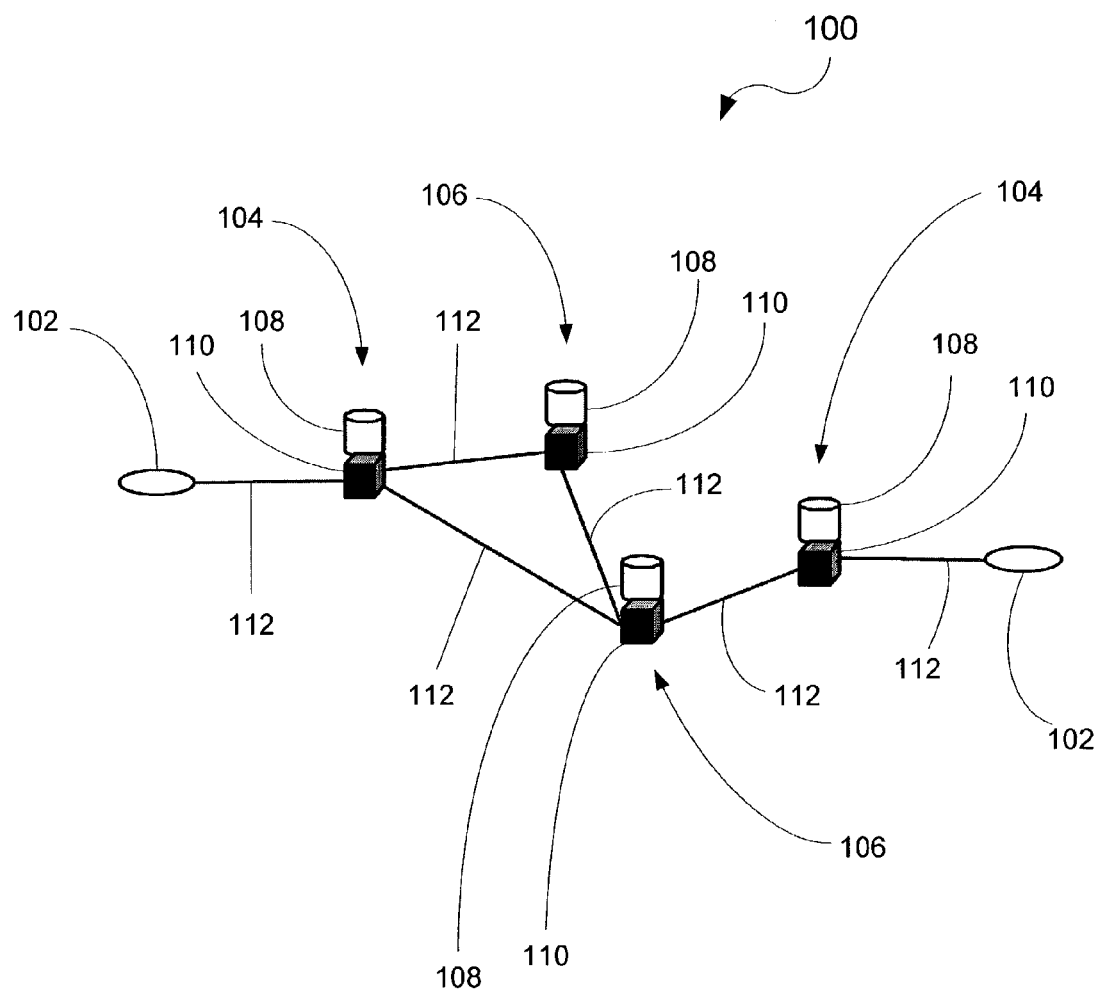
FIG. 1 shows a traditional intelligent photonic network (IPN) in a meshed topology.
Figure 2:
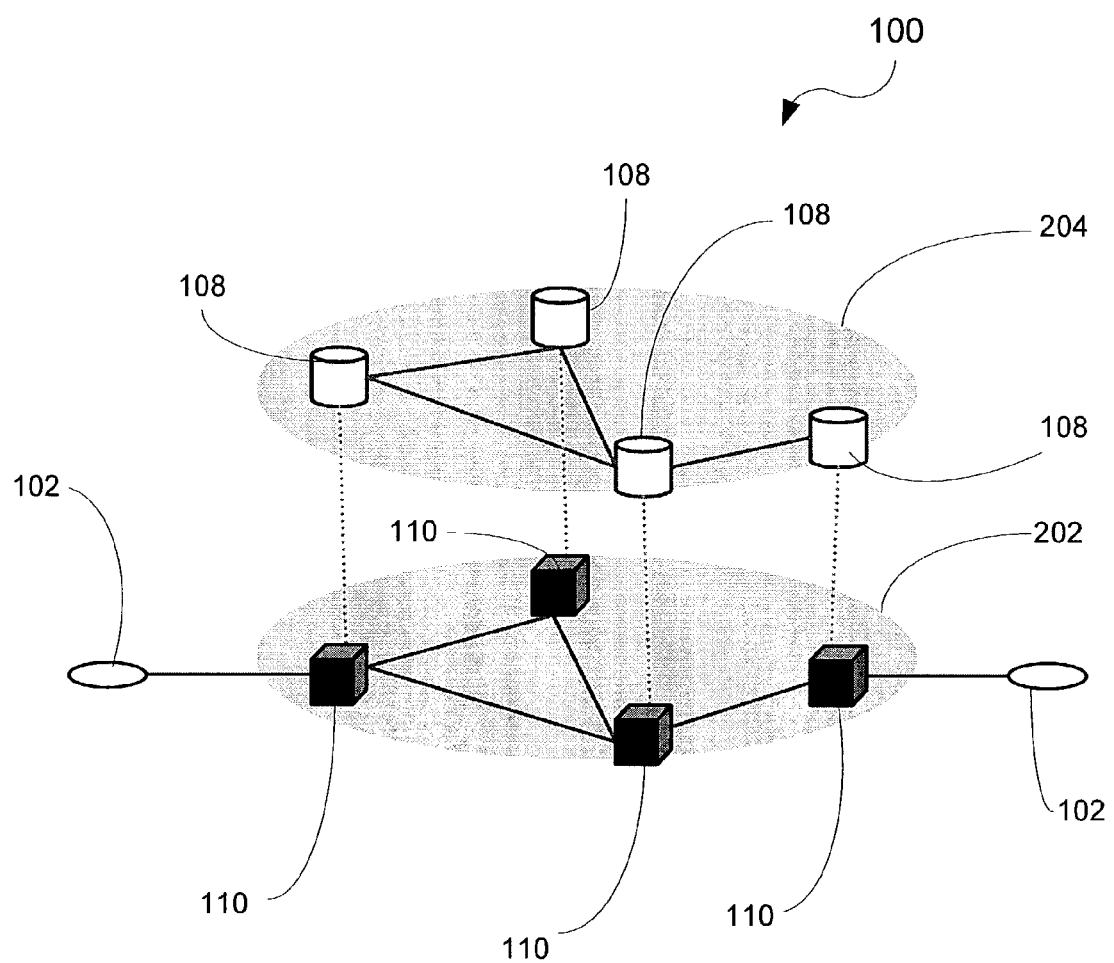
FIG. 2 shows a logical view of the network shown in FIG. 1.
Figure 3A:
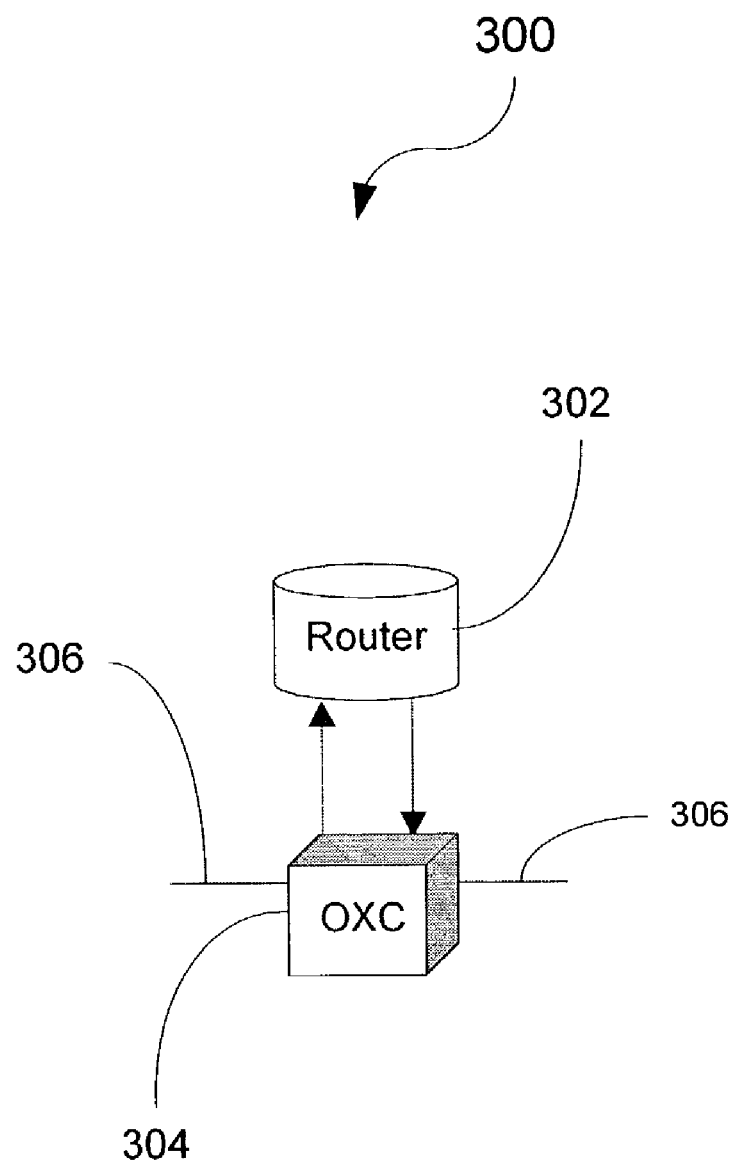
FIG. 3A shows an intelligent photonic switch node for use in an IPN network in accordance with the present invention.

Referring to FIG. 3A, there is shown an intelligent photonic switch node 300 for use in an IPN network in accordance with the present invention. That is, the switch node 300 may be used in an IPN network operating under an unreserved protection and restoration scheme to realize fast failure restoration and flexible network capacity utilization in accordance with the present invention.

As shown in FIG. 3A, the switch node 300 comprises a router 302 and an optical cross-connect (OXC) 304. The optical cross-connect (OXC) 304 is typically connected to two or more optical fibers 306 for receiving and transmitting network traffic. The router 302 operates in a control plane for handling network topology discovery, wavelength path calculation and selection, wavelength path signaling and provisioning (i.e., wavelength path setup and teardown), failure protection and restoration, and network resource management tasks. The router 302 operates in accordance with one or more intelligent protocols such as, for example, a set of Generalized Multi-Protocol Label Switching (G-MPLS) enabled protocols. It is the operation of the router 302 in accordance with the one or more intelligent protocols that makes the switch node 300 intelligent.

Figure 3B:
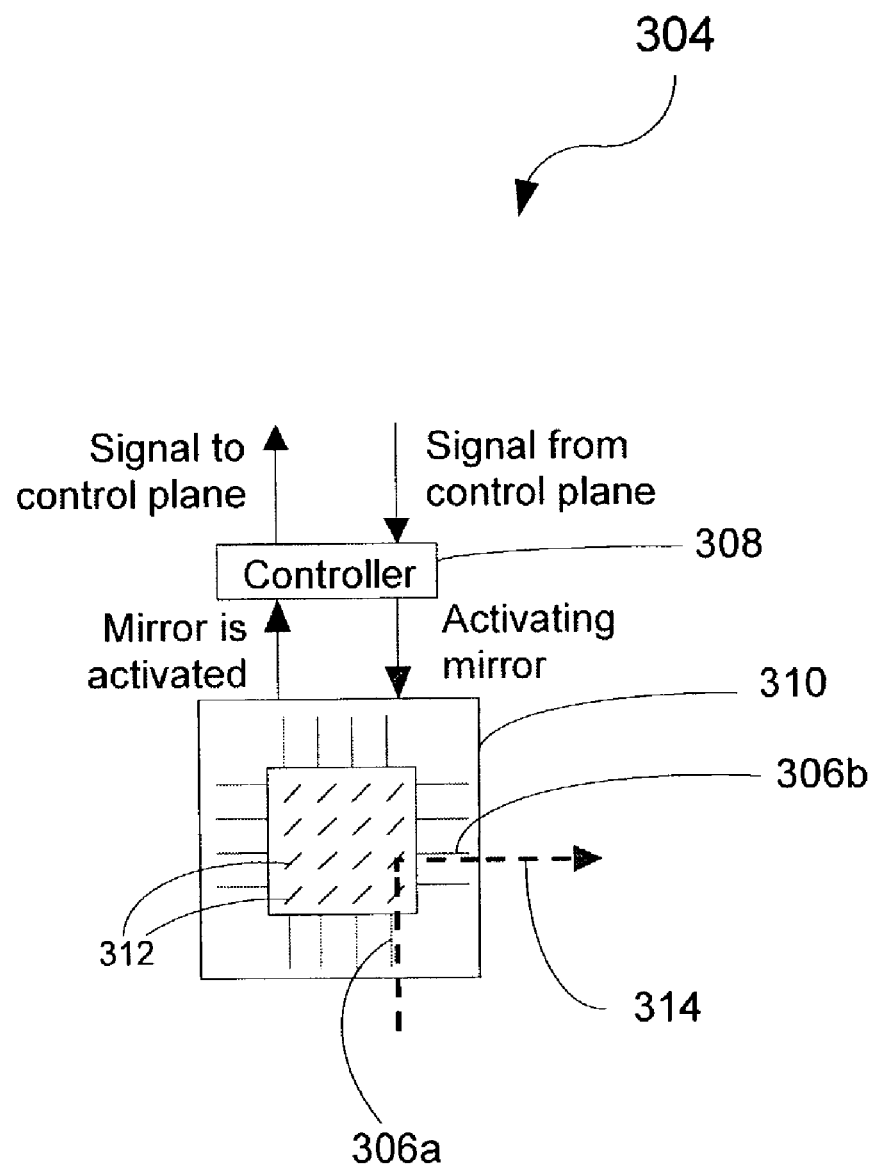
FIG. 3B shows a more detailed view of the optical cross-connect (OXC) shown in FIG. 3A.

The optical cross-connect (OXC) 304 operates in a data plane for handling all data forwarding. As shown in FIG. 3B, the optical cross-connect (OXC) 304 comprises an electronic switch controller 308 and an optical switching device 310, which is preferably implemented with relatively slow switching technology, such as micro-electronic mechanical system (MEMS) technology due to its advantages such as batch fabrication technique, small size, integratability, and scalability.

The optical switching device 310 shown in FIG. 3B, which may be fabricated using MEMS technology, comprises a plurality of mirrors 312 for reflecting an optical signal (e.g., 314) from an incoming optical fiber (e.g., 306a) to an outgoing optical fiber (e.g., 306b). The position of each of the plurality of mirrors 312 is controlled by the electronic switch controller 308 based upon an electrical control signal received from the router 302 (i.e., control plane). After a mirror 312 is properly positioned (i.e., activated) to reflect an optical signal (e.g., 314) from an incoming optical fiber (e.g., 306a) to an outgoing optical fiber (e.g., 306b), the electronic switch controller 308 notifies the router 302 (i.e., control plane) via an electrical notification signal.

A typical maximum positioning time ($t_{MEMS}$) for a mirror 312 fabricated using MEMS technology is 12 milliseconds. A typical maximum electrical signaling time ($t_{TRANS}$) between the router 302 (i.e., control plane) and the electronic switch controller 308 is 8 milliseconds. Thus, the total switching time ($t_{SW}$) from when the router 302 (i.e., control plane) sends an electrical control signal to the electronic switch controller 308, to when the electronic switch controller 308 sends an electrical notification signal to the router 302 (i.e., control plane) may be defined by:

$$t_{SW} = t_{TRANS} + t_{MEMS}$$

Using the above figures, the total switching time ($t_{SW}$) in a typical optical network is 20 milliseconds. Compared to a typical failure restoration time of 50 milliseconds in a Synchronous Optical Network (SONET) ring, this total switching time ($t_{SW}$) is obviously not negligible. Further, the total wavelength path establishment time is a summation of the time spent at every node and link along the wavelength path.

The switch node 300 of FIG. 3A has two essential tasks: 1.) establishing a wavelength path via the router 302 (i.e., control plane); and 2.) forwarding data using the established wavelength path via the optical cross-connect (OXC) 304 (i.e., data plane). These two essential tasks occur at a plurality of switch nodes 300 throughout an intelligent photonics network during a network data forwarding procedure. For example, a typical network data forwarding procedure occurs as follows: 1.) an access node initiates a wavelength path request to an edge node based upon data forwarding requirements at the access node; 2.) the edge node begins a wavelength path setup process through core nodes using routing and signaling protocols; 3.) data from the access node is forwarded after the wavelength path is established; and 4.) the wavelength path is torn down after data forwarding is completed.

After the wavelength path has been torn down, the wavelengths previously utilized in the wavelength path are released and are free to be used for other wavelength paths. Under normal network conditions, wavelength paths are setup and torn down dynamically based upon wavelength path requests and amount of data that is required to be forwarded. Thus, wavelength resource availability is dynamically changing all the time. When a link failure occurs (e.g., an optical fiber is cut), in the middle of data forwarding, for instance, the associated wavelength path is no longer able to forward data. At this point, a predefined failure protection and restoration scheme is invoked to prevent the data loss.

In an unreserved failure protection and restoration scheme, no protection wavelength path is reserved ahead of time for failure restoration. That is, in an unreserved failure protection and restoration scheme, a protection wavelength path may or may not be pre-calculated, but no protection wavelength path is reserved in advance. Thus, no wavelength assignment is performed at any node for failure protection and restoration purposes prior to a failure in an unreserved scheme.

In an unreserved failure protection and restoration scheme, data is forwarded along wavelength paths during normal operation. However, when a failure is detected, a protection wavelength path (pre-calculated or not) is dynamically established based on available bandwidth at current time. Thus, signaling or re-dialing is required. Furthermore, wavelength assignment (i.e., switching in the optical cross-connect (OXC) 304) of a newly established wavelength path for failure restoration must be done at each switch node 300 on a real-time basis. Once the new wavelength path is established, data is forwarded on the new wavelength path.

As previously mentioned, the disadvantage of an unreserved failure protection and restoration scheme is the long failure restoration time due to re-dialing and wavelength assignment. The advantage of an unreserved failure protection and restoration scheme is full flexible network capacity usage for wavelength paths under normal operating conditions because no specific capacity is reserved ahead of time for specific wavelength paths, although spare capacity is planned for restoration purposes. Thus, in an unreserved failure protection and restoration scheme, spare capacity can be used flexibly and dynamically for either restoration wavelength paths or regular data forwarding wavelength paths. The fundamental requirement of an unreserved failure protection and restoration scheme is proper network planning to ensure that some spare capacity is always available dynamically. The present invention builds on this fundamental requirement by minimizing the switching time ($t_{SW}$) required for wavelength assignment in an optical cross-connect (OXC) 304 of a switch node 300 during a failure restoration process, and by taking advantage of the dynamic features of the unreserved failure protection and restoration scheme.

The failure restoration process associated with an unreserved failure protection and restoration scheme may be divided into two parts: 1) failure detection and notification; and 2) failure restoration. The present invention focuses on the failure restoration part, while assuming a constant total time ($t_{NOTIF}$) for the failure detection and notification part.

Figure 4:
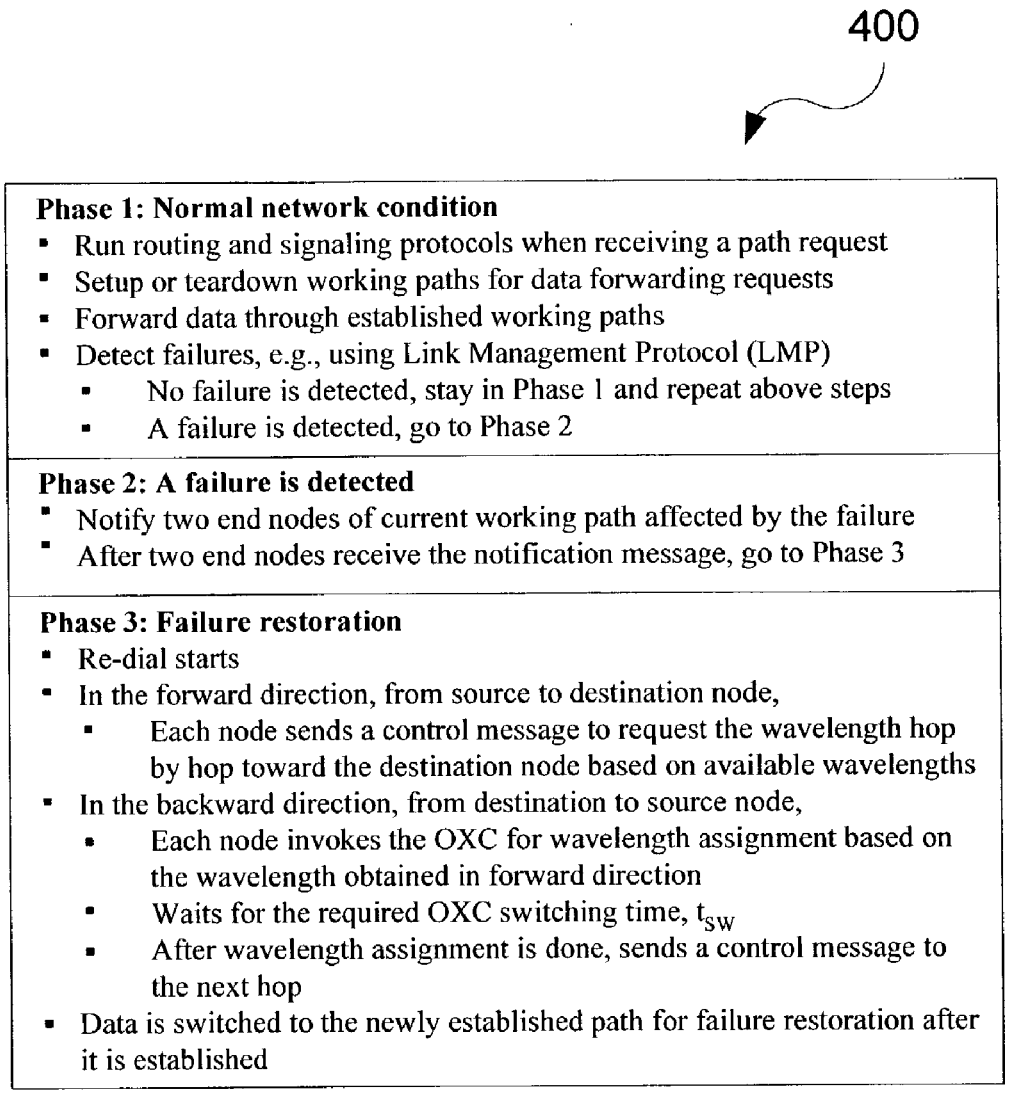
FIG. 4 shows a table listing a series of events that typically occur at each switch node in a network in accordance with a common unreserved restoration scheme.
Figure 5:
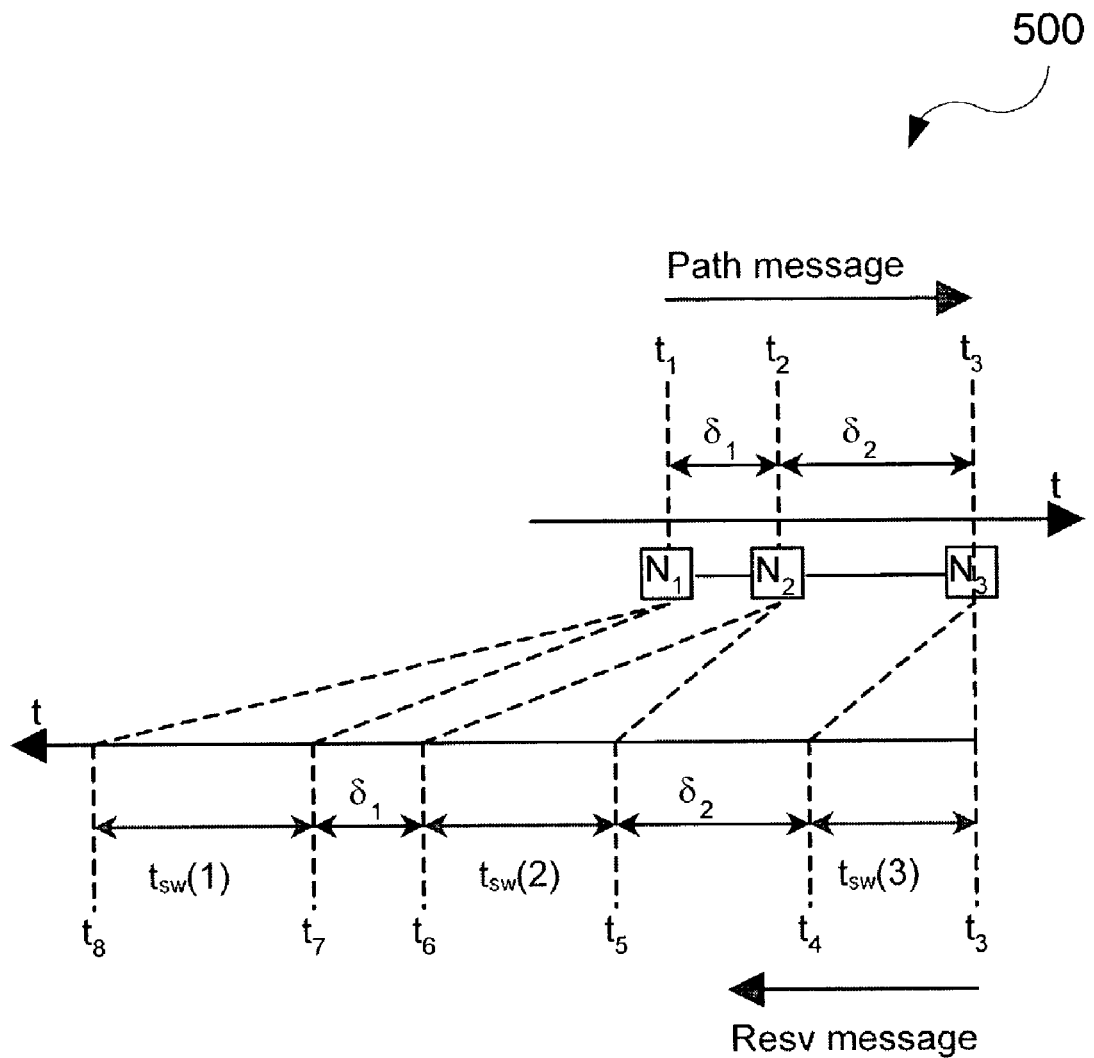
FIG. 5 illustrates how failure restoration is performed in accordance with a common unreserved restoration scheme.

Referring to FIG. 4, a table 400 is provided listing a series of events that typically occur at each switch node in accordance with a common unreserved restoration scheme operating under a protocol such as, for example, Resource Reservation Protocol-Traffic Engineering (RSVP-TE). An alternative protocol is the Constraint-based Routed Label Distribution Protocol (CR-LDP). FIG. 5 illustrates how restoration is performed after two edge nodes (i.e., nodes $N_1$ and $N_3$) receive a failure notification message. Assuming, for example, RSVP-TE is the protocol and that the new path for restoration includes 3 nodes (i.e., nodes $N_1$, $N_2$, and $N_3$), the total restoration time of a common unreserved restoration scheme for the above-described example may be expressed as:

$$t = t_{RT} + t_{SW}(1) + t_{SW}(2) + t_{SW}(3) + t_{NOTIF}$$

wherein $t_{RT}$ represents the round trip transmission time of signaling control messages (e.g., Path and Resv messages in RSVP-TE) along the path, $t_{SW}(i)$ represents the required optical cross-connect (OXC) switching time at node i (wherein i=1, 2, or 3), and $t_{NOTIF}$ represents the total time for failure detection and notification to the edges nodes (i.e., nodes $N_1$ and $N_3$).

At this point it should be noted that, in the above equation, it is assumed that the time required for control message processing at each node is small enough to be ignored. However, if the time required for control message processing at each node is not small enough to be ignored, it may be included in the above equation without preventing the practice of the present invention.

Specifically, $t_{RT}$ may be expressed as:

$$t_{RT}=2(\delta_1+\delta_2)$$

wherein $\delta_i$ represents the propagation time through optical fiber link i for a signaling control message.

Of course, if the path that is newly established for restoration has n nodes, then the total restoration time of a common unreserved restoration scheme may be expressed as:

$$t = t_{RT} + \sum_{i=1}^{n} t_{SW}(i) + t_{NOTIF}$$

and $$t_{RT}=2[\delta_1+\delta_2+\ldots+\delta_{n-1}]$$

The present invention is directed toward minimizing the total restoration time of a common unreserved restoration scheme as set forth above, and efficiently utilizing network capacity dynamically. The present invention achieves these features by reducing the optical cross-connect switching time so as to minimize failure restoration time. These features may be realized by way of a generic expression for total restoration time in an improved unreserved restoration scheme, which may be compared to the above-described expression for total restoration time in a common unreserved restoration scheme to appreciate the improvement.

In accordance with the present invention, the creation of a physical path is accelerated by starting to assign wavelengths in the forward direction when a node sends a signaling control message from a source node to a destination node. In other words, two procedures, signaling and wavelength assignment, are done in parallel, resulting in a significant reduction in restoration time.

Figure 7:
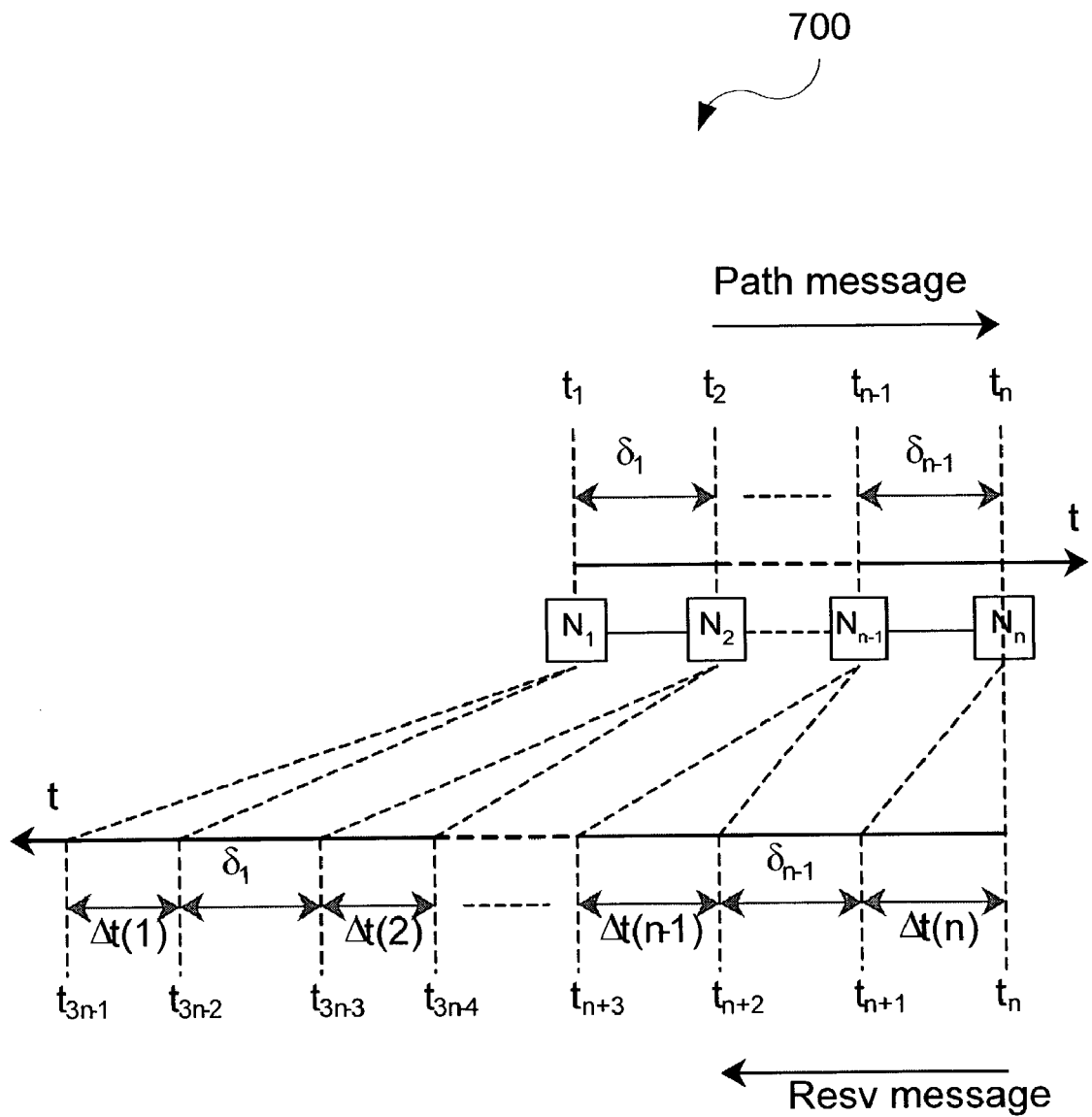
FIG. 7 illustrates how failure restoration is performed in accordance with the present invention.

Referring to FIG. 6, a table 600 is provided listing the series of events that occur at each switch node in accordance with the present invention. FIG. 7 illustrates how restoration is performed after two edge nodes (i.e., nodes $N_1$ and $N_n$) receive a failure notification message. Assume, for example, that RSVP-TE is again the protocol and that the new path for restoration includes n nodes (i.e., nodes $N_1, N_2, \ldots, N_n$). The restoration procedure starts at time $t_1$ immediately after nodes $N_1$ and $N_n$ receive a failure notification and ends at time $t_{3n-1}$ when the whole re-dial procedure is complete. The total restoration time of an improved unreserved restoration scheme for the above-described example may be expressed as:

$$t = t_{RT} + \sum_{i=1}^{n} t_{SW}(i) + t_{NOTIF} - t_{OVERLAP}$$

wherein $t_{RT}$ represents the round trip transmission time of signaling control messages (e.g., Path and Resv messages in RSVP-TE) along the path as previously defined above, $t_{SW}(i)$ represents the required optical cross-connect (OXC) switching time at node i as previously defined above, $t_{NOTIF}$ represents the total time for failure detection and notification to the edges nodes (i.e., nodes $N_1$ and $N_n$) as previously defined above, and $t_{OVERLAP}$ represents the overlapping time for the parallel events of signaling and optical cross-connect (OXC) switching for the real-time restoration path establishment.

At this point it should be noted that, in the above equation, it is assumed that the time required for control message processing at each node is small enough to be ignored. However, if the time required for control message processing at each node is not small enough to be ignored, it may be included in the above equation without preventing the practice of the present invention.

The above equation provides a generic expression for the total restoration time of an improved unreserved restoration scheme. In contrast, the total restoration time of an improved unreserved restoration scheme for the specific example illustrated in FIG. 7 may be expressed as:

$$t = t_{3n-1} - t_1 + t_{NOTIF} = t_{RT} + t_{SW}(n) + \sum_{i=1}^{n-1} \Delta t(i) + t_{NOTIF}$$

wherein $t_j$ represents the time when a signaling control message arrives at or departs from node i (wherein j=1, 2, ..., n, (n+1), ..., (3n-1)), and $\Delta t(i)$ represents the remaining optical cross-connect (OXC) switching time at node i, which equals the required optical cross-connect (OXC) switching time at node i minus an elapsed optical cross-connect (OXC) switching time introduced through the parallel process of signaling and optical cross-connect (OXC) switching.

As mentioned above, $\Delta t(i)$ is the required optical cross-connect (OXC) switching time at node i (i.e., $t_{SW}(i)$) minus an elapsed optical cross-connect (OXC) switching time introduced through the parallel process of signaling and optical cross-connect (OXC) switching. That is, the elapsed optical cross-connect (OXC) switching time is greater than or equal to zero due to overlapping events of signaling and switching. Thus, the elapsed optical cross-connect (OXC) switching time at node i may be expressed as:

$$t_E(n)=0$$

$$t_E(n-1)=t_{n+2}-t_{n-1}=2\delta_{n-1}+\Delta t(n)$$

$$t_E(n-2)=t_{n+4}-t_{n-2}=2(\delta_{n-1}+\delta_{n-2})+\Delta t(n)+\Delta t(n-1)$$

For example, the elapsed optical cross-connect (OXC) switching time at node $N_1$ may be expressed as:

$$t_E(1) = t_{3n-2} - t_1 = t_{RT} + \sum_{i=2}^{n} \Delta t(i)$$

From the above equations, the remaining switching time at node i (i.e., $\Delta t(i)$) may be expressed as:

$$\Delta t(i) = \begin{cases} 0, & \text{if } t_E(i) \geq t_{SW}(i) \\ t_{SW}(i) - t_E(i), & \text{otherwise} \end{cases}, i = 1, 2 \ldots n$$

Note that the elapsed switching time at node $N_n$ is zero due to the fact that the wavelength assignment is invoked at node $N_n$. Thus, the remaining switching time at node $N_n$ (i.e., $\Delta t(n)$) equals the required switching time at node $N_n$ (i.e., $t_{SW}(n)$) as shown below:

$$\Delta t(n)=t_{SW}(n)-t_E(n)=t_{SW}(n)$$

The above equations indicate that the remaining switching time at node i (i.e., $\Delta t(i)$) is in the range between zero and $t_{SW}(i)$. The best case is zero if the elapsed switching time (i.e., $t_E(i)$) is greater than or equal to the required switching time (i.e., $t_{SW}(i)$). As described in the table 600 of FIG. 6 and depicted in the illustration of FIG. 7, $\Delta t(i)=0$ means that in the backward direction, when a signaling control message arrives at node i, the optical cross-connect (OXC) switching operation has already been completed. Therefore, instead of waiting, node i may send a signaling control message to the next node immediately. The worst case is the required switching time (i.e., $t_{SW}(i)$) if the elapsed switching time (i.e., $t_E(i)$) is zero, which is no better than the common unreserved restoration scheme as described above.

Thus, the time that is saved through the use of an improved unreserved restoration scheme in accordance with the present invention may be expressed as:

$$t_{OVERLAP} = \sum_{i=1}^{n-1} t_{SW}(i) - \sum_{i=1}^{n-1} \Delta t(i)$$

Considering two boundary cases of variables $\Delta t(1), \Delta t(2), \ldots, \Delta t(n-1)$, the time saved through the use of an improved unreserved restoration scheme in accordance with the present invention (i.e., $t_{OVERLAP}$) may be obtained through:

$$t_{OVERLAP} = \sum_{i=1}^{n-1} t_{SW}(i), \text{ if } \Delta t(i) = 0 \text{ and } i = 1, 2, \ldots, n-1$$

which represents the best case that is the maximum saved time, and through:

$t_{OVERLAP}=0$, if $\Delta t(i)=t_{SW}(i)$ and $i=1, 2, \ldots, n-1$ which represents the worst case that is the minimum saved time.

From the above equations, the restoration time for the best case can be derived as follows:

$$t = t_{RT} + t_{SW}(n) + t_{NOTIF}, \text{ if } t_{OVERLAP} = \sum_{i=1}^{n-1} t_{SW}(i)$$

which is the minimum restoration time that may be achieved through the use of an improved unreserved restoration scheme in accordance with the present invention. The above equation demonstrates that the restoration time that may be achieved through the use of an improved unreserved restoration scheme in accordance with the present invention is minimized to the range that reserved restoration schemes can achieve. This may be more clearly seen by comparing the above equation with that revealing the best case scenarios of reserved restoration schemes. It should be noted that the restoration time in the best case scenarios in reserved restoration schemes is $t_{SW}(1)$ or $t_{SW}(n)$, whichever is greater, assuming that $t_{SW}(1)$ and $t_{SW}(n)$ are the required switching times at the source and destination nodes of a pre-allocated protection path.

The above equation also demonstrates that the restoration time that may be achieved through the use of an improved unreserved restoration scheme in accordance with the present invention is improved by $t_{OVERLAP}$ when comparing this equation with that of a common unreserved restoration scheme as described above. It should be noted that the worst case scenario will not occur using an improved unreserved restoration scheme in accordance with the present invention if retries are not needed because the optical cross-connect (OXC) switching event at each node always starts in the forward direction immediately after the signaling control message is sent, as described in the table 600 of FIG. 6. In other words, the elapsed optical cross-connect (OXC) switching time for node 1, 2, ..., n−1 is always greater than zero.

At this point it should be noted that the improved unreserved restoration scheme of the present invention inherits the need for retries as in a common unreserved restoration scheme. However, the improved unreserved restoration scheme of the present invention may be enhanced so as to allow redundant optical cross-connect (OXC) switching events to be avoided when retries are needed by introducing a threshold time. That is, in unreserved restoration schemes, under normal network conditions, each node keeps track of available capacity and runs routing and signaling protocols, as well as other protocols as usual. However, when a failure is detected, the source node of the failed path starts a restoration process based upon available capacity. As a real-time re-dial procedure is required in all unreserved restoration schemes, there is a possibility that the first try may not be successful. Even if the first try is successful, there is a possibility that the required wavelength (i.e., the suggested wavelength) is not available for wavelength allocation. In general, there could be three possible cases in unreserved restoration schemes.

Case 1: the first try is successful, and a suggested wavelength is available and accepted as a result of a wavelength path request at a destination node.

Case 2: the first try is successful, but a suggested wavelength is not free and a different wavelength is chosen as a result of a wavelength path request at a destination node.

Case 3: the first try is failed and retries are continued.

Figure 8:
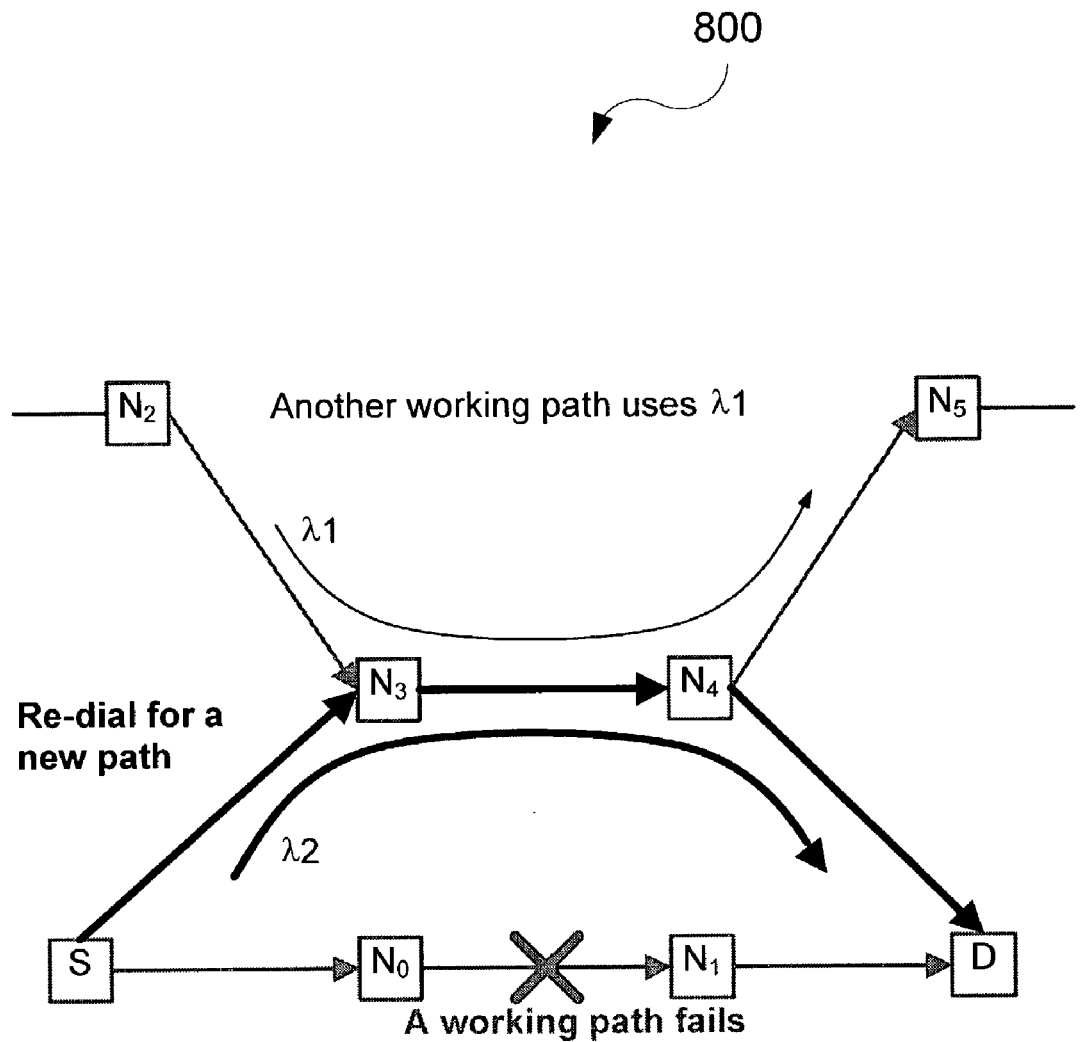
FIG. 8 illustrates a first scenario and a second scenario for which failure restoration is required using an unreserved restoration scheme.

Referring to FIG. 8, there is shown an illustration for the scenarios described in Cases 1 and 2 above. That is, assume that each optical fiber link in FIG. 8 consists of two wavelengths (i.e., $\lambda 1$ and $\lambda 2$). When re-dial starts after source and destination nodes (i.e., node S and node D) receive a failure notification, one of the wavelengths (i.e., $\lambda 1$) is used by another working path. The other wavelength (i.e., $\lambda 2$) is unused. If the suggested wavelength is $\lambda 2$, the new path may be established successfully with the suggested wavelength (i.e., Case 1). If the suggested wavelength is $\lambda 1$, the new path may be established successfully using $\lambda 2$, which is not the suggested wavelength (i.e., Case 2).

Figure 9:
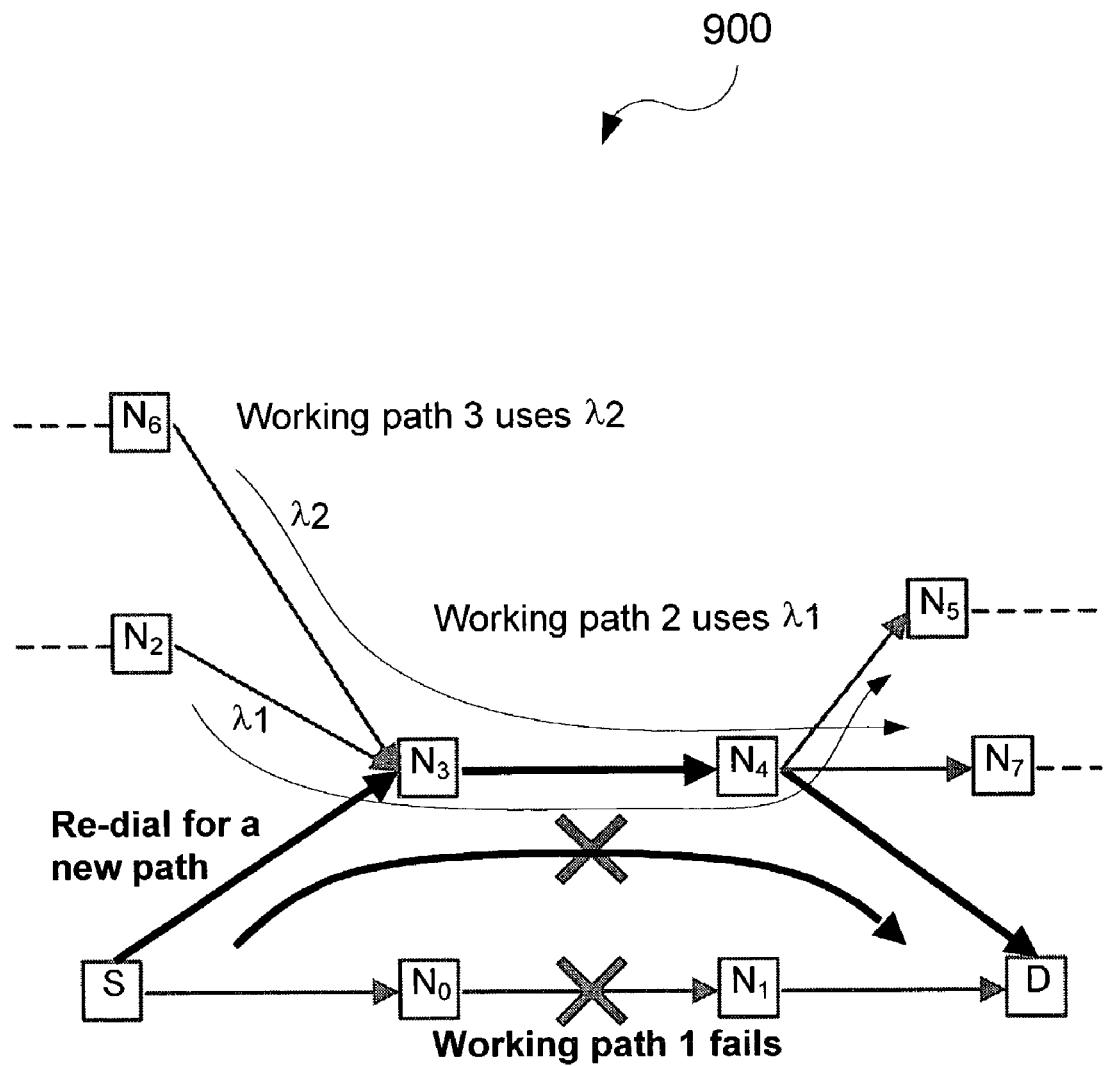
FIG. 9 illustrates a third scenario for which failure restoration is required using an unreserved restoration scheme.

Referring to FIG. 9, there is shown an illustration for the scenario described in Case 3 above. That is, assume that each optical fiber link in FIG. 9 consists of two wavelengths (i.e., $\lambda 1$ and $\lambda 2$). When re-dial starts after source and destination nodes (i.e., node S and node D) receive a failure notification, two wavelengths (i.e., $\lambda 1$ and $\lambda 2$) are both in use by other working paths. Thus, the first try will fail; retries will continue to look for other available paths with a suggested wavelength or another available wavelength (i.e., Case 3).

Common unreserved restoration schemes have an inherent need for retries due to the fact that the first try after a failure occurs cannot be guaranteed in these approaches. Since the improved unreserved restoration scheme of the present invention is an unreserved restoration scheme, it has the same inherent need. However, if Case 1 is encountered when using an improved unreserved restoration scheme in accordance with the present invention, the restoration time may be minimized because total optical cross-connect (OXC) switching time may be shortened significantly.

The intention of the present invention improved unreserved restoration scheme as set forth in the table 600 of FIG. 6 is to let optical cross-connect (OXC) switching events begin as early as possible. However, it is possible that an optical cross-connect (OXC) switching event may need to be repeated two or more times if Case 2 or Case 3 is encountered. For Case 2, if the available wavelength is different from the suggested wavelength, in the backward direction, each node needs to invoke an optical cross-connect (OXC) switching event for at least a second time to release the suggested wavelength allocated in the forward direction and assign the accepted wavelength. For Case 3, if a signaling control message in the forward direction is rejected at any node due to the lack of a wavelength resource, an error message is sent from this node back to upstream nodes to notify a source node of the error. Therefore, each upstream node needs to release the wavelength that has been allocated in the forward direction by invoking an optical cross-connect (OXC) switching event for at least a second time.

Referring to FIG. 10, a table 1000 is provided listing the series of events that occur at each switch node in accordance with an enhanced version of the present invention. That is, the improved unreserved restoration scheme of the present invention may be enhanced to overcome the drawbacks associated with the inherent need for retries in unreserved restoration schemes. This enhancement to the present invention improved unreserved restoration scheme allows redundant optical cross-connect (OXC) switching events to be avoided when retries are needed through the use of a threshold time.

For example, let $t_{TH}$ represent the threshold time, which may be defined as an interval between two events (i.e., sending a control message and invoking an optical cross-connect (OXC) switching event) at each hop in the forward direction during re-dials. Also, assuming the same example as illustrated in FIG. 7, and assuming the equations regarding restoration time for that example are still applicable, the elapsed optical cross-connect (OXC) switching time at node i for this enhanced version of the present invention improved unreserved restoration scheme may be expressed as:

$$t'_E(n)=0$$

$$t'_E(n-1)=t_{n+2}-[t_{n-1}+t_{TH}]=t_E(n-1)-t_{TH}$$

$$t'_E(n-2)=t_{n+4}-[t_{n-2}+t_{TH}]=t_E(n-2)-t_{TH}$$

For example, the elapsed optical cross-connect (OXC) switching time at node $N_1$ for this enhanced version of the present invention improved unreserved restoration scheme may be expressed as:

$$t'_E(1)=t_{3n-2}-[t_1+t_{TH}]=t_E(1)-t_{TH}$$

As the elapsed optical cross-connect (OXC) switching time at node i (i.e., $t'_E(i)$) in the above equations is greater than or equal to zero, $t_{TH}$ should be specified in a range between zero and min $\{t_E(1), t_E(2), \ldots, t_E(n-1)\}$. Correspondingly, the remaining switching time (i.e., $\Delta t'(i)$) at node i in this enhanced version of the present invention improved unreserved restoration scheme may be expressed as:

$$\Delta t'(i) = \begin{cases} 0, & \text{if } t'_E(i) \geq t_{SW}(i) \\ t_{SW}(i) - t'_E(i), & \text{otherwise} \end{cases}, i = 1, 2 \ldots n$$

Note that the remaining switching time (i.e., $\Delta t'(i)$) at destination node $N_n$ in this enhanced version of the present invention improved unreserved restoration scheme may be expressed as:

$$\Delta t'(n)=t_{SW}(n)-t'_E(n)=t_{SW}(n)$$

From the foregoing equations, the saved time in the enhanced version of the present invention improved unreserved restoration scheme may be expressed as:

$$t_{OVERLAP} = \sum_{i=1}^{n-1} t_{SW}(i) - \sum_{i=1}^{n-1} \Delta t'(i)$$

Comparing the above equations, it turns out that the equations for the worst case and best case time saved as derived above for the series of events listed in table 600 of FIG. 6 are applicable for the enhanced version of the present invention improved unreserved restoration scheme. Also, the equation for the total restoration time as derived above for the series of events listed in table 600 of FIG. 6 are applicable for the best case of the enhanced version of the present invention improved unreserved restoration scheme. However, the equations derived immediately above for the series of events listed in table 1000 of FIG. 10 indicate that the overall elapsed optical cross-connect (OXC) switching time at each node is decreased by $t_{TH}$. In other words, the overall remaining switching time at each node is increased by $t_{TH}$, and the time saved at each node is affected by $t_{TH}$.

As mentioned above, by introducing $t_{TH}$, the present invention improved unreserved restoration scheme allows redundant optical cross-connect (OXC) switching events to be avoided when retries are needed. That is, in the enhanced version of the present invention improved unreserved restoration scheme, if Case 2 is encountered, $t_{TH}$ allows optical cross-connect (OXC) switching events in the backward direction to begin first. Also, in the enhanced version of the present invention improved unreserved restoration scheme, if Case 3 is encountered, $t_{TH}$ allows each node to wait for an error message if a wavelength path request in the forward direction is rejected at any node. To avoid redundant optical cross-connect (OXC) switching events when retries are needed, the value of $L_{TH}$ is required to be at the level of $t_{RT}$. If $t_{RT}$ is too large, the performance efficiency in the present invention improved unreserved restoration scheme (i.e., in both the enhanced and non-enhanced versions) will be affected.

In summary, the present invention provides a technique for minimizing restoration time and efficiently utilizing network capacity dynamically in photonic networks. More particularly, the present invention takes advantage of the inherent switching characteristics of common unreserved protection and restoration schemes to reduce failure restoration time by reducing aggregated optical cross-connect (OXC) switching time during the real-time signaling process. The present invention technique allows failure restoration times to be minimized to the point where they are comparable with restoration times achieved using reserved failure restoration schemes, assuming sufficient network capacity has been allotted. Meanwhile, the present invention technique allows network capacity to be efficiently utilized for working paths dynamically with full flexibility when the network is operating under normal conditions. An enhanced version of the present invention technique allows redundant optical cross-connect (OXC) switching events to be avoided when retries are needed, which is an inherent disadvantage of common unreserved restoration schemes. Since a key feature of the present invention technique is to speed up the signaling process by reducing aggregated optical cross-connect (OXC) switching time, the present invention technique may also be implemented for signaling under normal network conditions to establish regular wavelength paths in an intelligent optical network.

At this point it should be noted that restoring path failures in accordance with the present invention as described above typically involves the processing of input data and the generation of output data to some extent. This input data processing and output data generation may be implemented in hardware or software. For example, specific electronic components may be employed in a router or similar or related circuitry for implementing the functions associated with restoring path failures in accordance with the present invention as described above. Alternatively, one or more processors operating in accordance with stored instructions may implement the functions associated with restoring path failures in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for transmitting an optical signal along an optical wavelength path through an optical network having a plurality of network nodes, the method comprising the steps of:
    transmitting a first message from a first node to a second node requesting an optical wavelength path from the first node to at least the second node; and
    simultaneously configuring an optical signal switching element in the first node to transmit an optical signal along the requested optical wavelength path from the first node to the second node.

2. The method of claim 1, wherein the step of simultaneously configuring comprises invoking an optical wavelength switching event in the first node concurrently with the step of transmitting the first message.

3. The method of claim 2, further comprising the step of:
    receiving a second message at the first node indicating that the previously invoked optical wavelength switching event is valid.

4. The method of claim 3, further comprising the step of:
    determining if the previously invoked optical wavelength switching event is complete.

5. The method of claim 4, further comprising the step of:
    transmitting a third message from the first node indicating that the previously invoked optical wavelength switching event is complete.

6. The method of claim 1, wherein the step of simultaneously configuring comprises scheduling an optical wavelength switching event in the first node at a specific time.

7. The method of claim 6, further comprising the step of:
    receiving a second message at the first node indicating that the previously scheduled optical wavelength switching event is valid.

8. The method of claim 7, further comprising the step of:
    determining if the previously scheduled optical wavelength switching event is in progress.

9. The method of claim 8, further comprising the step of:
    transmitting a third message from the first node indicating that the previously scheduled optical wavelength switching event is complete.

10. The method of claim 8, further comprising the steps of:
    canceling the previously scheduled optical wavelength switching event if not yet in progress; and
    invoking another optical wavelength switching event.

11. The method of claim 10, further comprising the step of:
    transmitting a third message from the first node indicating that the invoked optical wavelength switching event is complete.

12. At least one processor readable storage medium for storing a computer program of instructions configured to be readable by at least one processor for instructing the at least one processor to execute a computer process for performing the method as recited in claim 1.

13. An apparatus for transmitting an optical signal along an optical wavelength path through an optical network having a plurality of network nodes, the apparatus comprising:
    a router for transmitting a first message from a first node to a second node requesting an optical wavelength path from the first node to at least the second node; and
    an optical signal switching element in the first node that is simultaneously configured to transmit an optical signal along the requested optical wavelength path from the first node to the second node.

14. The apparatus of claim 13, wherein the optical signal switching element is simultaneously configured by having an optical wavelength switching event invoked in the first node concurrently with the transmission of the first message.

15. The apparatus of claim 14, wherein the router transmits a second message from the first node indicating that the previously invoked optical wavelength switching event is complete.

16. The apparatus of claim 13, wherein the optical signal switching element is simultaneously configured by having an optical wavelength switching event scheduled in the first node at a specific time.

17. The apparatus of claim 16, wherein the router transmits a second message from the first node indicating that the previously scheduled optical wavelength switching event is complete.

18. The apparatus of claim 16, wherein the router cancels the previously scheduled optical wavelength switching event if not in progress at another specific time, and the optical signal switching element is then alternatively configured by having another optical wavelength switching event invoked.

19. The apparatus of claim 18, wherein the router transmits a second message from the first node indicating that the previously invoked optical wavelength switching event is complete.

* * * * *